(12) United States Patent
Lisch

(10) Patent No.: US 11,738,499 B2
(45) Date of Patent: Aug. 29, 2023

(54) METHOD OF INSTALLING A SEAL FOR A CONTAINER PRIOR TO CONTAINER EJECTION

(71) Applicant: DISCMA AG, Zürich (CH)

(72) Inventor: G. David Lisch, Jackson, MI (US)

(73) Assignee: Discma AG, Zürich (CH)

( * ) Notice: Subject to any disclaimer, the term of this patent is extended or adjusted under 35 U.S.C. 154(b) by 0 days.

(21) Appl. No.: 17/867,206

(22) Filed: Jul. 18, 2022

(65) Prior Publication Data

US 2023/0001624 A1 Jan. 5, 2023

Related U.S. Application Data

(62) Division of application No. 15/773,094, filed as application No. PCT/US2016/021357 on Mar. 8, 2016, now Pat. No. 11,390,012.

(60) Provisional application No. 62/250,370, filed on Nov. 3, 2015.

(51) Int. Cl.
| | | |
|---|---|---|
| *B29C 49/46* | (2006.01) | |
| *B29C 49/06* | (2006.01) | |
| *B29C 49/02* | (2006.01) | |
| *B29C 49/42* | (2006.01) | |
| *B29C 49/12* | (2006.01) | |

(52) U.S. Cl.
CPC .............. *B29C 49/46* (2013.01); *B29C 49/12* (2013.01); *B29C 49/06* (2013.01); *B29C 2049/023* (2013.01); *B29C 2049/4294* (2013.01); *B29C 2049/465* (2013.01); *B29C 2049/4664* (2013.01)

(58) Field of Classification Search
CPC .... B29C 2049/4294; B29C 2049/4296; B29C 2049/465; B29C 2049/4664; B29C 49/46; B67B 1/10; B67B 1/04; B67B 3/22; B65B 7/2821; B65B 7/2807
See application file for complete search history.

(56) References Cited

U.S. PATENT DOCUMENTS

| | | |
|---|---|---|
| 4,098,053 A | 7/1978 | Shank |
| 2013/0106028 A1 | 5/2013 | Lisch et al. |
| 2013/0161878 A1 | 6/2013 | Maki et al. |
| 2014/0174044 A1 | 6/2014 | Chauvin et al. |
| 2016/0052190 A1* | 2/2016 | Frankenberger ............ B29C 49/42069 425/162 |

FOREIGN PATENT DOCUMENTS

| | | |
|---|---|---|
| EP | 2860016 A1 | 4/2015 |
| JP | 57123027 A | 7/1982 |
| WO | 2013117492 A1 | 8/2013 |

* cited by examiner

*Primary Examiner* — Xiao S Zhao
*Assistant Examiner* — John J DeRusso
(74) *Attorney, Agent, or Firm* — Honigman LLP; Jonathan P. O'Brien; Eric J. Sosenko

(57) ABSTRACT

A method of hydraulically blow molding a container from a preform using a liquid end product as a liquid blow medium. The method includes the steps of hydraulically blow molding a formed and filled container from a preform using the liquid blow medium and engaging a fluid tight seal with the container while the container is retained within a mold in the forming station. The engaging of the seal includes engaging an axially extending ring of the seal in one of a press-fit or frictional engagement with an inner surface of the container such that the seal is retained on the container by that engagement.

16 Claims, 6 Drawing Sheets

METHOD OF INSTALLING A SEAL FOR A CONTAINER PRIOR TO CONTAINER EJECTION

CROSS REFERENCE TO RELATED APPLICATIONS

This application is a divisional application of U.S. application Ser. No. 15/773,094, filed May 2, 2018, which is a national stage entry of international application no. PCT/US2016/021357, filed Mar. 8, 2016, which claims the benefit of U.S. provisional patent application No. 62/250,370, filed Nov. 3, 2015, the entire contents of all of which are herein incorporated by reference.

BACKGROUND

1. Field of the Invention

The present invention generally relates to the molding and filling of plastic containers while using the liquid end product as molding medium. More specifically, the invention relates to sealing the liquid end product in the container prior to ejection of the container from the forming station of the hydraulic blow molding machine.

2. Description of Related Technology

Plastic containers for liquid products are manufactured by various different methods. In some methods, a plastic preform is injection molded in a preform molding machine and subsequently cooled to ambient temperatures. A second machine, which may be in a remote location relative to the first machine, re-heats the preform to a suitable temperature for molding, places the thermally conditioned preform within a mold and then expands the preform, both axially and radially, to form a container. Such a process is known as a two-step molding process, and a corresponding system is known as a two-step system.

In another process, the injection molding of the preform and the subsequent forming of the container all occur, in the same machine or in different machines, without allowing the preform to significantly cool and require reheating. Such processes, machines and systems are correspondingly known as one-step technologies.

In either of the above, air has traditionally been used as the blow medium to axially and radially expand the preform and form the container. Instead of using air as the blow medium, a more recent process use the liquid end product, the product intended to be retained and distributed in the container, as the blow medium. The processes, apparatuses and systems that form and fill a container using the liquid end product as the blow medium are generally known as liquid or hydraulic blow molding technologies. Hydraulic blow molding can also be practiced via either a two-step or one-step molding scheme.

As used herein, the term "liquid" is intended to encompass non-gas, flowable mediums. The liquid may therefore have a low viscosity (like water or alcohol), a medium viscosity (like edible oil or soup) or a high viscosity (like catsup or yogurt). Also the liquid may be homogeneous or nonhomogeneous and is not intended to be limited to foodstuff. Non-limiting illustrative examples of liquids that may be utilized with the present invention include cleansing products (for body, house or automotive care), medical fluids, industrial fluids, automotive fluids, and agricultural fluids.

In a typical hydraulic blow molding machine, at the container forming station, a forming head is provided with an injection nozzle, a seal pin and a stretch rod. The injection nozzle is axially movable along the central axis, by an actuator, between engaged and disengaged positions where the injection nozzle seals with either the preform, surfaces of the mold securing the preform or surfaces of a neck ring that secures the preform to the mold.

Defined through the interior of the injection nozzle is a central passageway. This central passageway is in communication with a source of the liquid blow medium. When provided to the central passageway, the liquid blow medium is pressurized, preferably by one of the well-known devices used for providing pressurized fluids during the molding and filling of containers. These devices include several motors, pressure pumps, pistons and other appropriate devices.

Located within the central passageway is a seal pin that is axially movable between extended and retracted positions along the central axis. This movement is effectuated by an actuator, which may be of any well-known variety of actuator utilized in connection with the hydraulic blow molding of plastic containers. Such actuators are often pneumatically driven, but may be driven by other means, including without limitation, electric motors, servomotors, magnetic or other means. The distal end of the seal pin typically includes a head having surfaces defining a sealing ring that engages a sealing seat provided on a sealing bell, the latter of which may be considered as part of the injection nozzle and which is located adjacent to and/or defines the exit orifice of the injection nozzle.

Extending through a longitudinal bore in the seal pin is a stretch rod or member. The stretch rod is extendable by an actuator (similar to the previously mentioned actuators) out of the seal pin, through the exit orifice and into the body of the preform. When fully extended, the stretch rod engages a closed end of the preform and axially stretches the preform to assist in forming the container.

Typically, once a mold has closed about the body of the preform, with the body of the preform being located within a mold cavity defining the shape of the desired container, the forming head and/or injection nozzle is lowered by the actuator to create the sealed engagement with the preform. At this time, the seal pin is in an extended position and is sealingly engaged with the injection nozzle. Next, the stretch rod is extended to engage the closed-end of the preform and the seal pin is retracted to open the exit orifice and allow the liquid blow medium to be injected into the preform. Simultaneously with or in advance of the opening of the exit orifice, the stretch rod may be further and fully extended to impinge the closed-end of the preform between the distal end of the stretch rod and the bottom of the mold cavity. The continued injection of liquid blow medium causes the axially stretched preform to radially expand into conformity with the surfaces of the mold cavity, thereby simultaneously forming and filling the container. Once the container is formed and filled, the stretch rod is retracted and the seal pin extended, the latter closing the injection nozzle and thereby stopping the introduction of the liquid into the container. After the forming head and injection nozzle are retracted, the mold may be opened and the formed and filled container removed from the forming station.

As seen from the above, when being removed from the forming station, the filled container is not capped and sealed. This can therefore lead to some of the liquid product contained therein being spilled as the container is ejected from the forming station and transferred to a capping station.

SUMMARY

In one aspect the present invention provides a method of hydraulically blow molding a container from a preform using a liquid end product as a liquid blow medium.

In another aspect, the present invention provides a method of hydraulically blow molding a container from a preform using a liquid end product as a liquid blow medium, wherein, in a forming station, a container is hydraulically blow molded resulting in a formed and filled container. A fluid tight seal is engaged with the container while the container is retained within a mold in the forming station. The engaging step includes engaging an axially extending ring of the seal in one of a press-fit or frictional engagement with an inner surface of the container. The retaining of the seal on the container is achieved through the engagement of the axially extending ring of the seal with the inner surface of the container. Thereafter, the container, having the seal engaged therewith, is removed from the forming station.

In another aspect, the method is performed in a one-step hydraulic blow molding apparatus.

In a further aspect, the step of engaging the seal with the container includes engaging a radial flange of the seal with a top sealing surface of the container.

In An additional aspect, a parting line is defined in the top sealing surface and the step of engaging the radial flange with the top sealing surface engages the radial flange with the top sealing surface at a location radially inward of the parting line.

In another aspect, a parting line is defined on an exterior surface of the finish and the radial flange engages all of the top sealing surface.

In a further aspect, the inner surface of the container is an axially extending inner surface of the container.

In an additional aspect, the inner surface of the container is an axially and circumferentially extending surface of the container.

In still a further aspect, the method includes the step of attaching a cap to the container.

In an additional aspect, the step of attaching the cap to the container includes threadably engaging the cap with the container.

In another aspect, the invention provides a method of hydraulically blow molding a container from a preform using an incompressible end product as a blow medium, the method comprising the steps of: in a forming station, from a preform, hydraulically blow molding, forming and filling a container using the blow medium; engaging a fluid tight seal with the finish of container while the container is retained within a mold in the forming station, the engaging step further including inserting an axially extending ring of the seal into the finish of the container; engaging the axially extending ring with an axially extending inner surface of the finish, wherein the engaging of the axially extending ring and the axially extending inner surface of the container is one of a press-fit engagement or frictional engagement; retaining the seal on the container by the engagement of the axially extending ring with the axially extending inner surface of the finish; and removing the container having the seal engaged therewith from the forming station.

In a further aspect, the step of engaging the seal with the finish of the container includes positioning a radial flange of the seal over a top sealing surface of the finish of the container.

In another aspect, a parting line is defined in the top sealing surface, and the step of positioning the radial flange of the seal over the top sealing surface positions the radial flange radially inward of the parting line.

In yet another aspect, a parting line is defined on an exterior surface of the finish and the radial flange is position over all of the top sealing surface.

In still a further aspect of the invention, the inner surface of the container is an axially extending inner surface of the container.

In an additional aspect, the inner surface of the container is an axially and circumferentially extending surface of the container.

In still another aspect, the method includes the step of attaching a cap to the container.

In yet a further aspect, the step of attaching the cap to the container includes threadably engaging the cap with the container.

Further objects, features and advantages of this invention will become readily apparent to persons skilled in the art after review of the following description with reference to the drawings and the claims that are appended to inform a part of this specification.

DETAILED DESCRIPTION

The present invention is applicable to containers formed and filled in a hydraulic blow molding process of either a one-step or two-step variety. As noted above, a hydraulic blow molding process is one by which a plastic container is simultaneously formed and filled utilizing the liquid end product as the blow medium. As a result of the liquid blow medium, the hydraulic blow molding process has many issues and challenges that are not appreciated by traditional blow molding technologies utilizing air as the blow medium.

One such issue and challenge involves the removal of the formed and filled container from the mold assembly. Since the container is already filled with the liquid end product, forces created when removing the filled container at high speed can result in some liquid end product being spilled from the container. This spillage has the potential to contaminate various surfaces and components of the machine, which in turn may lead to subsequently produce containers being inadequately formed. To prevent such spillage, the present invention provides a system and method by which a liner seal is engaged with the finish of the formed and filled container prior to removal from the mold assembly of the hydraulic blow molding apparatus.

As used herein, the term "liquid" is intended to encompass non-gas, flowable mediums. The liquid may therefore have a low viscosity (like water or alcohol), a medium viscosity (like edible oil or soup) or a high viscosity (like catsup or yogurt). Also the liquid may be homogeneous or nonhomogeneous and is not intended to be limited to foodstuff. Non-limiting illustrative examples of liquids that may be utilized with the present invention include cleansing products (for body, house or automotive care), medical fluids, industrial fluids, automotive fluids, and agricultural fluids.

Two embodiments incorporating the principles of the present invention are presented herein. These embodiments depend on the manner in which the preform is initially formed and the resultant structure of the preform. The first embodiment is presented in connection with FIGS. 1-6 and the second embodiment is presented in connection with FIGS. 7-12.

Figure 2:
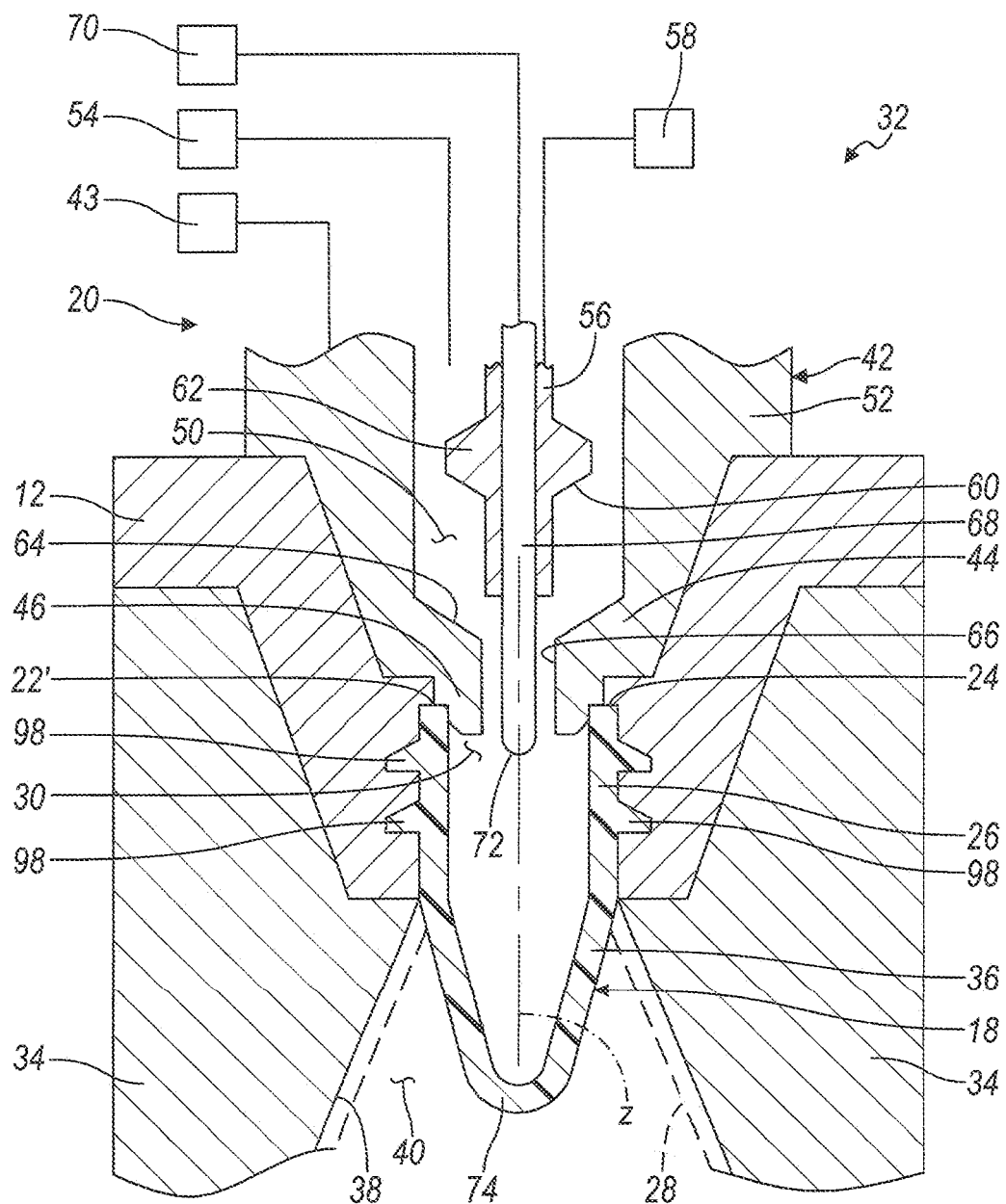
FIG. 2 is a cross-sectional view illustrating a portion of a container forming station in which the preform molded in FIG. 1 is formed into a container by injecting a liquid blow medium into the preform.
Figure 3:
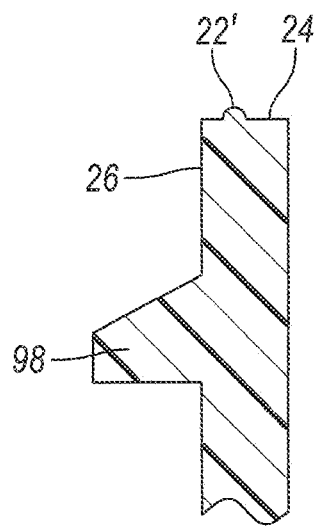
FIG. 3 is an enlarged view of part of the finish of the container formed in FIG. 2 and shows the parting line being located on the top sealing surface of the finish.
Figure 4:
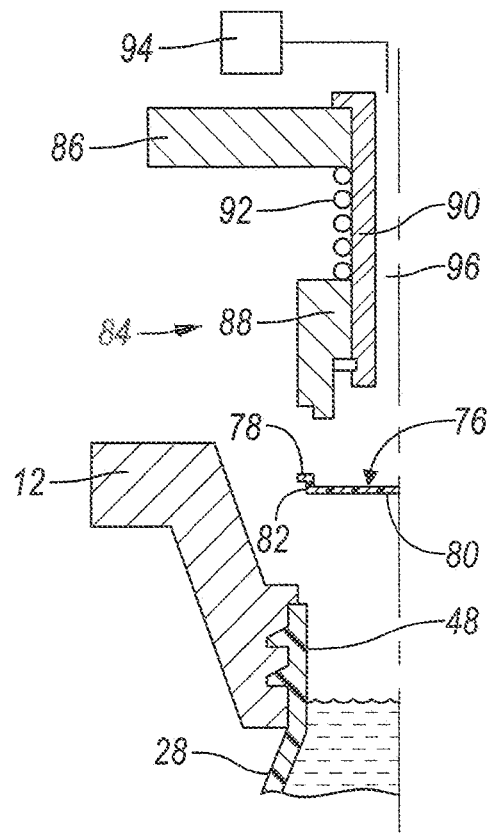
FIGS. 4 and 5 are schematic illustration of a mechanism for placing a liner seal in engagement with a formed and filled container prior to ejection of the container from the mold.

At an injection molding station 10, thread splits 12 are engaged between a preform core 14 and a preform cavity mold 16 prior to the injection molding of the preform 18, which is seen FIG. 2, and cooperate to define a molding cavity 19 in the desired shape of the preform 18. Molten plastic resin, such as polyethylene terephthalate (PET), is injected into the molding cavity 19 by an injection device 20 through a gate 21 formed in the preform cavity mold 16.

Figure 1:
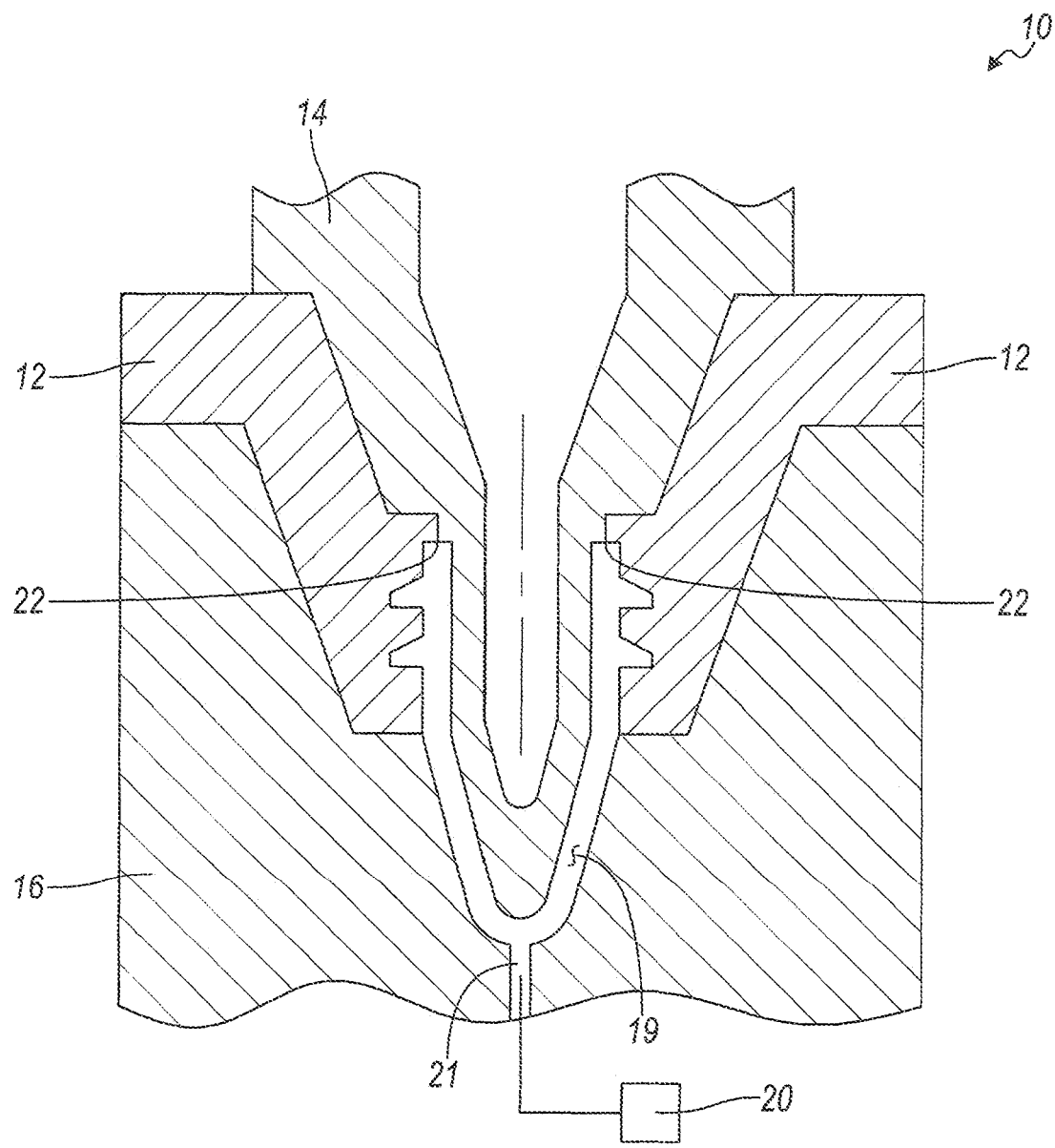
FIG. 1 is a cross-sectional view illustrating a portion of an injection molding station in which a preform for a container is molded with the parting line of the preform located on the top sealing surface of the preform.

As seen in FIG. 1, the thread splits 12 engage with the preform core 14 such that a parting line 22 between the thread splits 12 and the preform core 14 is located approximately midway in that portion of the mold cavity 19 that will form a top sealing surface (TSS) 24 of the finish 26 of a resultant container 28. The TSS 24 is the end surface of the preform 18 and generally extends around the opening or mouth 30 of the preform 18. The existence of the parting line 22 between the preform core 14 and the thread splits 12 results in an artifact, sometimes referred to as flash or also as a parting line (and herein designated as parting line 22'), being formed on the preform 18 and the container 28. The above features are readily seen in FIG. 3. If the parting line 22' is on the TSS 24, it may impact the sealing of the container 28.

In a one-step process, after molding the preform 18 in the injection molding station 10, the preform 18 is transferred to a container forming station 32, which is schematically illustrated in FIG. 2. A two-step process would similarly transfer the preform 18 to a container forming station, but would not use the thread splits 12 to achieve this transfer. The forming and filling steps discussed herein, however, would generally be the same.

In the forming station 32, mold halves 34 are closed about the thread splits 12 and the body 36 of the preform 18. The mold halves include interior surfaces 38 that cooperate to define a cavity 40 in the desired shape of the resultant container 28.

With the preform 18 secured within the thread splits 12 and the mold halves 34, a forming head 42 is lowered by an actuator 43 such that a nozzle bell 44 engages portions of the thread splits 12 and sealingly engages the preform 18. In the illustrated embodiment, the nozzle bell 44 includes a collar 46 that engages with an inward half of the TSS 24 and extends into the mouth 30 of the preform 18 and along interior surfaces 48 of the finish 26.

The forming head 42 has a central passageway 50 defined within a nozzle body 52 and through which is defined a central axis Z. Coupled to the forming head 42, a source 54 of the liquid blow medium is in communication with the central passageway 50 and provided thereto at a pressure sufficient to cause the preform 18 to expand and form the container 28, as further discussed below.

Also located within the central passageway 50 is a seal pin 56. The seal pin 56 is axially movable, by a corresponding actuator 58 along a central axis Z through the central passageway 50. The seal pin 56 is movable between an extended position and a retracted position. In the extended position, a sealing surface 60 formed on a sealing boss 62 sealingly engages a correspondingly shaped sealing seat 64 formed on an interior surface of the nozzle bell 44. This sealing engagement closes off the exit orifice 66 and prevents liquid blow medium from being discharged from the forming head 42. As seen in FIG. 2, the sealing surface 60 and the sealing seat 64 are correspondingly shaped as conical, tapered surfaces.

In the retracted position of the sealing pin 56, the sealing boss 62 is retracted into the central passageway 50 and the sealing surface 60 spaced apart from the sealing seat 64 of the nozzle bell 44. As a result, the exit orifice 66 is open and the liquid blow medium is injected from the central passageway 50 into the interior of the preform 18.

Prior to the injecting of the liquid blow medium into the preform 18, a stretch rod 68 is extended by a corresponding actuator 70 until the distal end 72 of the stretch rod 68 engages a closed-end 74 of the preform 18. Either prior to or simultaneous with the injecting of the liquid blow medium, the stretch rod 68 is further advanced so as to axially stretch the preform 18. During axial stretching, the stretch rod 68 may impinge the closed-end 74 of the preform 18 against surfaces of the mold halves 34 defined the bottom of the container 28. As a result of the injection of the liquid blow medium, the body 36 of the preform 18 is also radially expanded until it contacts the interior surfaces 38 of the mold halves 34 thereby simultaneously forming and filling the container 28, which is shown in phantom in FIG. 2.

In accordance with the principles of the present invention, a seal 76, which is preferably an inner liner/seal, is engaged with the finish 26 to seal the mouth 30 of the filled container 28 prior to the removal of the container 28 from the forming station 32. Since the inner liner/seal 76 is provided on the filled container 28 prior to its removal, no spillage of the liquid product from within the container 28 will occur.

Figure 6:
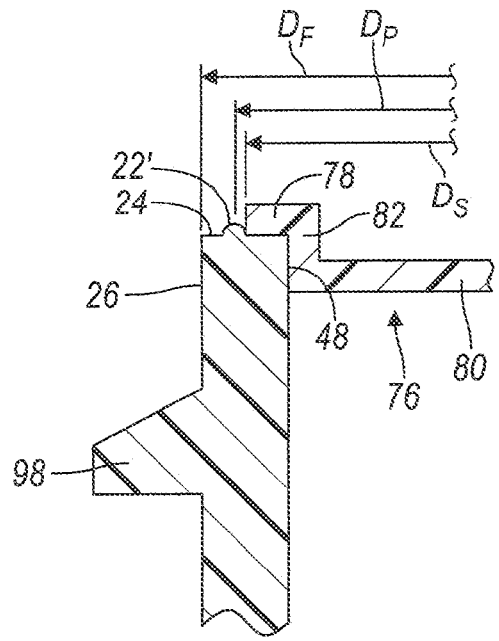
FIG. 6 is an enlarged partial view of the finish of the filled container and shows the liner seal mounted to the finish.
Figure 5:
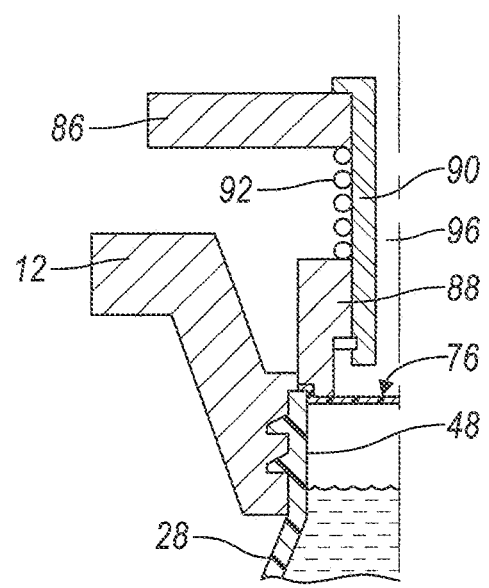

In the first embodiment, and as particularly seen in FIG. 6, the inner liner/seal 76 has a radial flange 78 that defines an outer diameter $D_s$ of the inner liner/seal 76 that is less than the outer diameter $D_f$ of the finish 26 or TSS 24 of the container 28. More specifically, the diameter $D_s$ is dimensioned so that the radial flange 78 terminates adjacent to or before, and does not extend over, the parting line 22' on the TSS 24. The inner liner/seal 76 can, therefore, also be seen as having a diameter $D_s$ that is less than the diameter $D_p$ defined by the parting line 22'.

In addition to radial flange 78, the inner liner/seal 76 includes a central disc 80, which is connected to the radial flange 78 by an axially extending ring 82. The ring 82 extends axially from the innermost end of the radial flange 78 so that, when the inner liner/seal 76 is engaged with the container 28, the ring 82 extends along and is in surface-to-surface sealing contact, a press-fit or frictional engagement, with the inner surface 48 of the finish 26 defining the mouth 30 of the container 28. The disc 80 extends across the ring 82 and closes off the inward region of the inner liner/seal 76. The disc 80 is thus located on the ring 82 opposite from the radial flange 78. The sealing engagement defined by the inner liner/seal 76 is therefore defined by both the engagement of the radial flange 78 with a portion of the TSS 24 and the engagement of the ring 82 with a portion of the inner surface 48 of the finish 26.

In order to engage the inner liner/seal 76 with the finish 26 of the filled and formed container 28, the eject rod fixing plate 86 of the forming station 32 may be modified to include a sealing mechanism 84 and carry a plug 88 whose end is correspondingly stepped or otherwise shaped to receive and hold the inner liner/seal 76. In the illustrated embodiment, the plug 88 is fixedly mounted to a hollow shaft 90 which extends through an opening of the fixing plate 86. Between the fixing plate 86 and the plug 88, generally along the exterior of the shaft 90, is a compression spring 92. The compression spring 92 biases the plug 88 in a direction away from the fixing plate 86. The placement of the inner liner/seal 76 on the plug 88 may be effectuated by a mechanical device or a robot (not shown) and retention in position on the end of the plug 88 by either an interference fit or by a vacuum 94 applied to the plug 88 either through an air channel 96 in the shaft 90 or other means.

After forming and filling of the container 28, but before removal from the forming station 32, the fixing plate 86, with the inner liner/seal 76 mounted thereon, is moved downwardly to engage the container 28. As a result, the inner liner/seal 76 is inserted into the finish 26, stopping when the radial flange 78 contacts the TSS 24 and is impinged between the plug 88 and the TSS 24. The spring 92 located between the plug 88 and the fixing plate 86 ensures that the inner liner/seal 76 is not over compressed by the downward movement of the fixing plate 86 and plug 88.

Once the inner liner/seal 76 is engaged with the finish 26, the vacuum 94 is released and the greater frictional engagement between ring 82 of the inner liner/seal 76 and the inner surfaces 48 of the finish 26 disengages the inner liner/seal 76 from the plug 88. Alternatively, application of a slight positive pressure through the air channel 96 can be provided to ensure that the inner liner/seal 76 disengages from the plug 88.

With the inner liner/seal 76 in place on the finish 26, the filled container 28 can be removed from the forming station 32 without worry that liquid product in the container will be spilled during the removal step.

From the forming station the container 28, with the inner liner/seal 76 in place, can be transferred to a capping station where cap (not shown) is attached and engaged with the exterior threads 98 of the finish 26. In this regard, it is noted that the seal 76 utilized herein is distinguishable from a cap, since the seal 76, as that term is used herein, is not in threaded engagement with the finish 26.

Referring now to FIGS. 7-12, a second embodiment incorporating the principles of the present invention is illustrated therein. The second embodiment includes numerous elements that are the same as elements discussed above in connection with FIGS. 1-6. Accordingly, like elements are identified with the same reference numerals and discussion of their function and operation is omitted in connection with FIGS. 7-12 in the interest of brevity. In that regard, reference should be made to the prior discussion of the same elements in connection with FIGS. 1-6. The discussion which follows, therefore, focuses on the differences between the second embodiment and the first embodiment.

Figure 7:
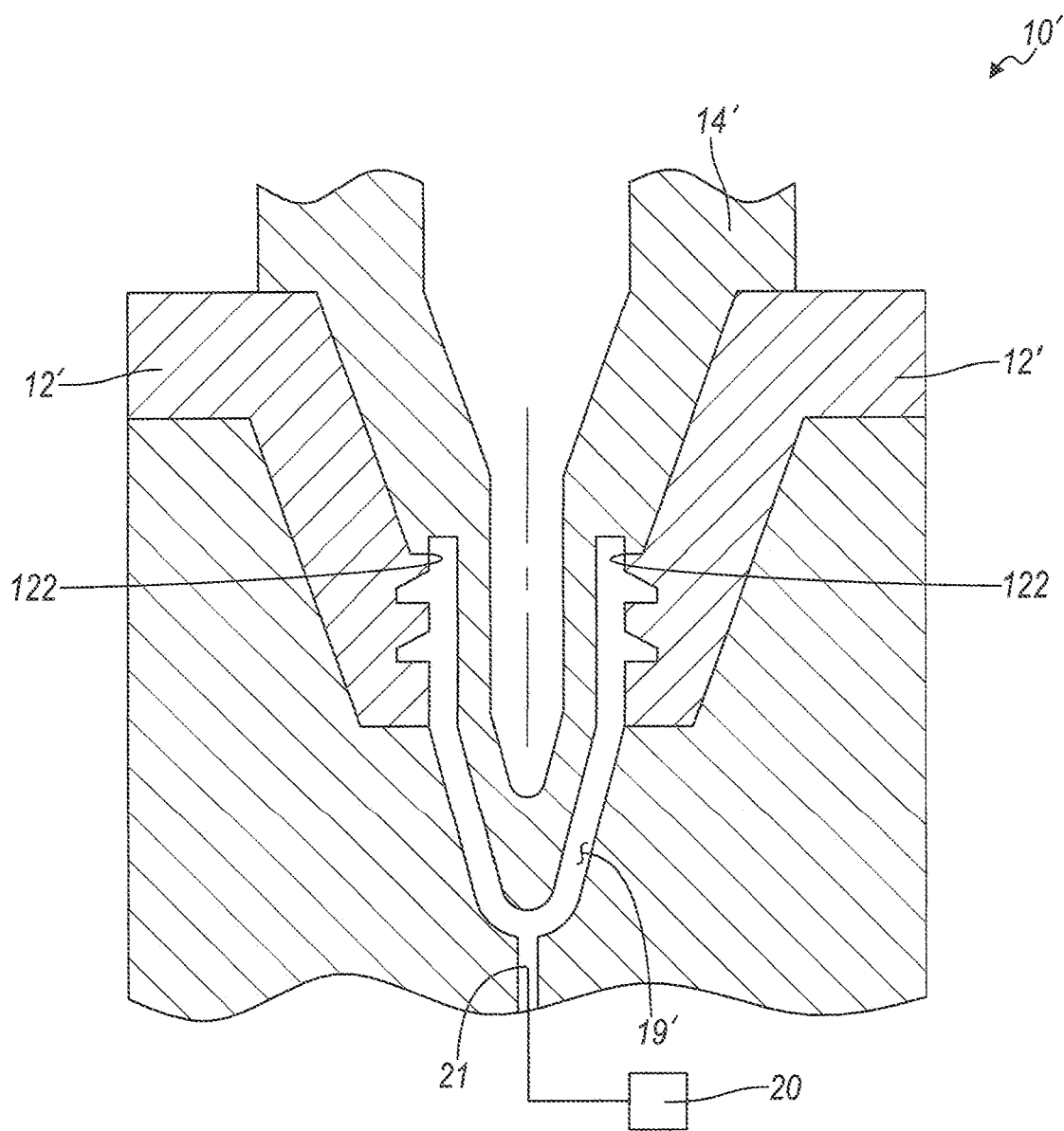
FIG. 7 is a cross-sectional view illustrating a portion of an injection molding station in which a preform for a container is molded with the parting line of the preform is located on an exterior side surface of the finish.

As seen in FIG. 7, in one respect, the second embodiment differs from the first embodiment in that the thread splits 12 and the preform core 14 engage with one another so as to define a parting line 122 that is not located in the area the preform cavity 19 that defines the TSS 24. Rather, the thread splits 12 and the preform core 14 engage one another so that the parting line 122 is located in an area that defines a radial exterior surface of the preform 18. Thus, a portion of the preform core 14 completely defines the TSS 24 and the open end of the preform 18. The parting line 122 is seen in FIG. 7 as being located between the portions defining the top sealing surface 24 and the uppermost portion of the threads 98 of the preform 18.

Figure 8:
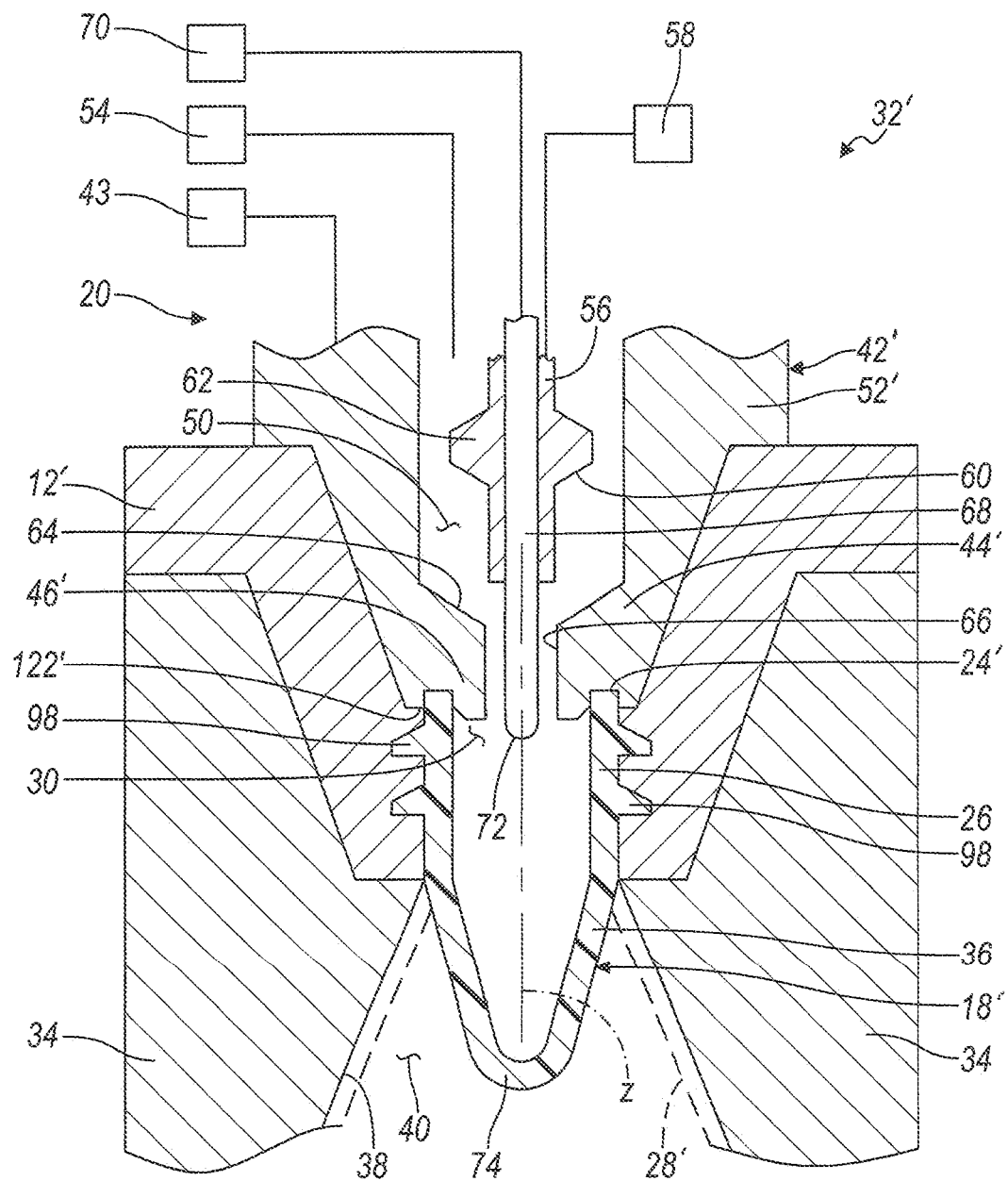
FIG. 8 is a cross-sectional view illustrating a portion of a container forming station in which the preform molded in FIG. 7 is formed into a container by injecting a liquid blow medium into the preform.
Figure 9:
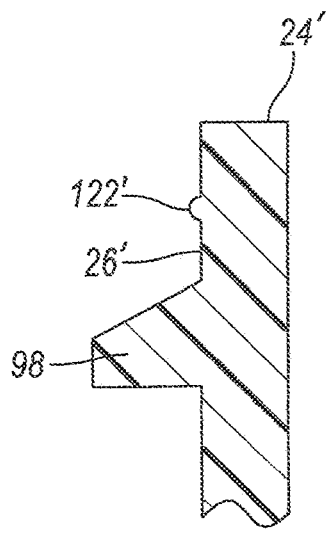
FIG. 9 is an enlarged view of part of the finish of the container formed in FIG. 8 and shows the parting line being located on the exterior side surface of the finish.
Figure 10:
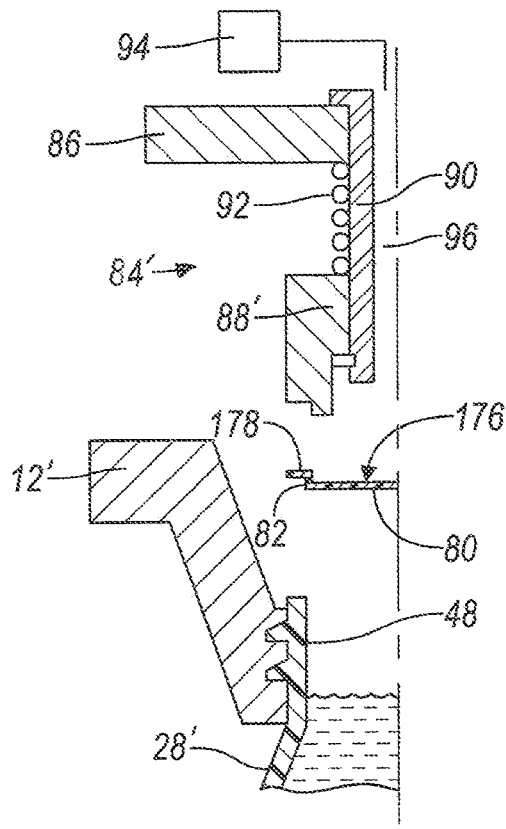
FIGS. 10 and 11 are schematic illustration of a mechanism for placing an alternative liner seal in engagement with a formed and filled container prior to ejection of the container from the mold.
Figure 12:
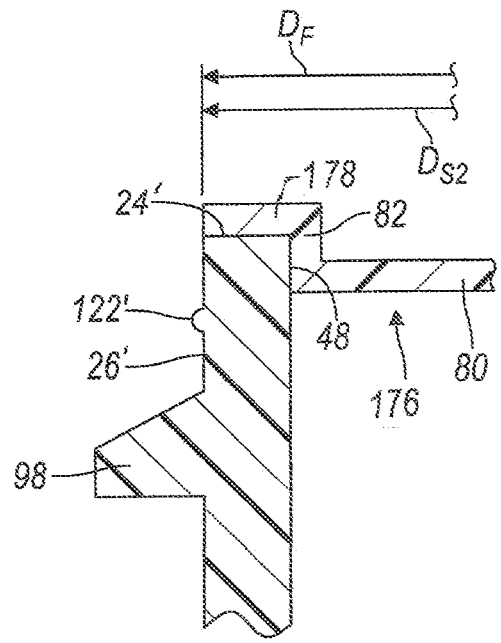
FIG. 12 is an enlarged partial view of the finish of the filled container and shows the alternative liner seal mounted to the finish.
Figure 11:
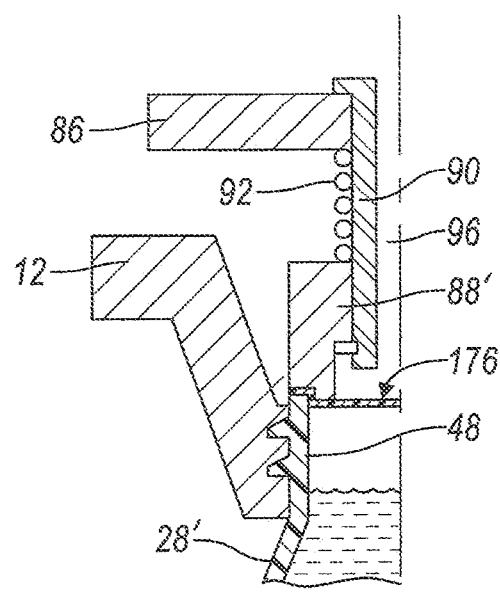

The container forming station 32 seen in FIG. 8 is likewise similar to the container forming station 32 seen in FIG. 2. The distinction between the structures of forming station 32 seen in FIG. 8 is that the lower end of the nozzle bell 44 is shaped to mate with the thread splits 12 in FIG. 2 on the exterior side of the finish 26. The lower end of the nozzle bell 44 thus extends over the TSS 24 of the preform 18. Otherwise, the container forming station 32 operates and functions in the same fashion as described above in connection with FIG. 7, which is herein referred to.

In accordance with the principles of the second embodiment invention, an inner liner/seal 176 is also engaged with the finish 26 to seal the mouth 30 of the filled container 28 prior to the removal of the container 28 from the forming station 32. In this embodiment, however, the inner liner/seal 176 has a radial flange 178 that defines an outer diameter Ds2 is of the same or about the same as the outer diameter Df of the finish 26 or TSS 24 of the container 28. More specifically, the diameter Ds2 is dimensioned so that the radial flange 78 terminates at or adjacent to the outer circumference or perimeter of the TSS 24. In this configuration, the radial flange 178 is sealingly engaged across the entire TSS 24.

The remainder of the inner liner/seal 176 of the second embodiment is constructed in the same manner as the prior embodiment. Similarly, the mechanism for mounting the inner liner seal 176 to the finish 26 of the filled container 28 is constructed and operates as previously discussed above, the distinction merely being that the plug 88' is shaped at its lower end to correspond with the shape of the inner liner seal 176. Reference is therefore made to the discussion provided above in connection with FIGS. 4 and 5.

As a person skilled in the art will readily appreciate, the above description is meant as an illustration of implementation of the principles of this invention. This description is not intended to limit the scope or application of this invention since the invention is susceptible to modification, variation and change, without departing from the spirit of this invention, as defined by the following claims.

I claim:

1. A method of hydraulically blow molding a formed and filled container from a preform using a liquid end product as a liquid blow medium, the method comprising the steps of:
    in a forming station, hydraulically blow molding the formed and filled container from the preform using the liquid blow medium;
    engaging a fluid tight seal with the formed and filled container while the formed and filled container is retained within a mold in the forming station, the engaging step including engaging an axially extending ring of the seal in one of a press-fit or frictional engagement with an inner surface of the formed and filled container;
    retaining the seal on the formed and filled container by the engagement of the axially extending ring of the seal with the inner surface of the formed and filled container; and
    removing the formed and filled container having the seal engaged therewith from the forming station.

2. The method according to claim 1, wherein the method is performed in a one-step hydraulic blow molding apparatus.

3. The method according to claim 1, wherein the step of engaging the seal with the formed and filled container includes engaging a radial flange of the seal with a top sealing surface of the formed and filled container.

4. The method according to claim 3, wherein a parting line is defined in the top sealing surface and the step of engaging the radial flange with the top sealing surface engages the radial flange with the top sealing surface at a location radially inward of the parting line.

5. The method according claim 3, wherein a parting line is defined on an exterior surface of a finish of the formed and filled container and the radial flange engages all of the top sealing surface.

6. The method according to claim 1, wherein the inner surface of the formed and filled container is an axially extending inner surface of the formed and filled container.

7. The method according to claim 1, wherein the inner surface of the formed and filled container is an axially and circumferentially extending surface of the formed and filled container.

8. The method according to claim 1, further comprising the step of attaching a cap to the formed and filled container.

9. The method according to claim 8, wherein the step of attaching the cap to the formed and filled container includes threadably engaging the cap with the formed and filled container.

10. A method of hydraulically blow molding a container from a preform using an incompressible end product as a blow medium, the method comprising the steps of:
    in a forming station, from the preform, hydraulically blow molding, forming and filling the container using the blow medium;
    engaging a fluid tight seal with a finish of the container while the container is retained within a mold in the forming station, the engaging step further including
        inserting an axially extending ring of the seal into the finish of the container;
        engaging the axially extending ring with an axially extending inner surface of the finish, wherein the engaging of the axially extending ring and the axially extending inner surface of the container is one of a press-fit engagement or frictional engagement;
    retaining the seal on the container by the engagement of the axially extending ring with the axially extending inner surface of the finish; and
    removing the container having the seal engaged therewith from the forming station.

11. The method according to claim 10, wherein the step of engaging the seal with the finish of the container includes positioning a radial flange of the seal over a top sealing surface of the finish of the container.

12. The method according to claim 11, wherein a parting line is defined in the top sealing surface, and the step of positioning the radial flange of the seal over the top sealing surface positions the radial flange radially inward of the parting line.

13. The method according to claim 11, wherein a parting line is defined on an exterior surface of the finish and the radial flange is positioned over all of the top sealing surface.

14. The method according to claim 10, wherein the inner surface of the finish is an axially and circumferentially extending surface of the finish.

15. The method according to claim 10, further comprising the step of attaching a cap to the container.

16. The method according to claim 10, wherein the step of attaching the cap to the container includes threadably engaging the cap with the container.

* * * * *